Figure 1:
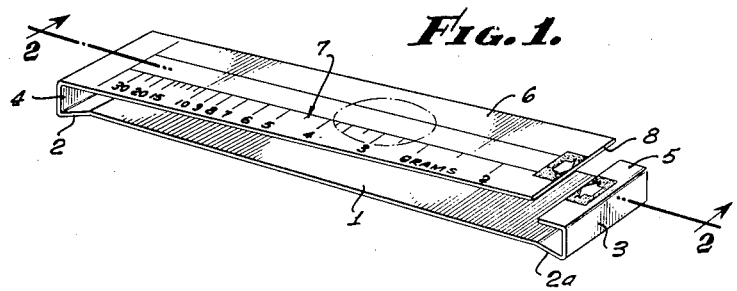

March 18, 1958     W. L. DIETER     2,827,277

WEIGHING SCALE

Filed Feb. 4, 1955

WILLIAM L. DIETER
INVENTOR.

BY

*Calvin Brown,*

ATTORNEY.

United States Patent Office 2,827,277
Patented Mar. 18, 1958

2,827,277

WEIGHING SCALE

William L. Dieter, Whittier, Calif.

Application February 4, 1955, Serial No. 486,100

1 Claim. (Cl. 265—63)

The present invention relates to improvements in weighing scales of the type which is particularly adapted to the measuring of the weight or pressure of a phonograph pick-up stylus, such as would be exerted by the stylus upon the groove of a phonograph record.

At the present time, the groove construction and pitch of present day phonograph records is such that stylus pressure is critical in the long-playing records, in that excessive pressure will cause abnormal record wear and also wear the stylus. Too light a stylus pressure is detrimental, in that the stylus may cause record damage by jumping the grooves. Further needs for precise control of pressure is dictated by the recent introduction and use of phono-pick-up designs requiring closely controlled pressures of values in the range of two grams. There are a number of weighing scales now on the market for measuring stylus pressure; however, none of said weighing scales, so far as the inventor is aware, employ the improved features of the present invention.

An object of the invention is to provide a weighing scale whereby the pressure of the stylus can be measured so that necessary adjustment can be made to the phonograph arm counterweight or compensating spring usually provided on the pick-up arm for this purpose.

Further objects of this invention are:

To provide a simple, compact, accurate yet inexpensive form of weighing scale.

To employ the deflection characteristics common to cantilever beams; to provide a weighing scale having an exponential scale, such that more precise weighing measurements of smaller units of weight may be obtained for the lighter pressures and less precise measurements for heavier pressures.

To provide a weighing scale of one-piece construction in the interest of reduction in cost.

To provide a weighing scale of one-piece construction to eliminate inaccuracy caused by rotating or pivoting joint friction that is common to multiple element gauges.

To provide a weighing scale which serves as a weighing platform to receive the stylus and simultaneously provide space for graduations which are optically visible.

To provide a weighing scale of low platform height upon which the stylus is positioned to more closely simulate the vertical position of the stylus on an actual record, thereby reducing any measurement error from pressure on an actual record since there exist pick-up arms having counter-weights or springs so arranged as to permit varying pressure with vertical position of the stylus.

To provide a weighing scale of campact design that is optically easy to read.

To provide a weighing scale that can be readily checked for accuracy.

Figure 2:
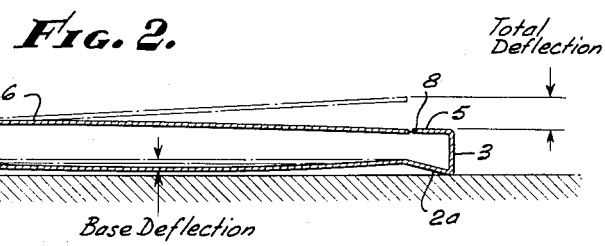
Figure 3:
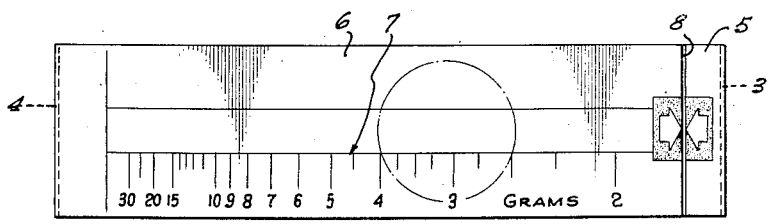

In the drawing:

Figure 1 is a perspective view of the improved weighing scale of the present invention, Figure 2 is a sectional view on the line 2—2 of Figure 1, the platform of said weighing scale being in moved position, Figure 3 is a top plan view of the weighing scale showing the scale graduations.

Referring to the drawing, the improved weighing scale is preferably formed from an elongated, rectangular strip of metal or other material, as hereinafter set forth, so bent as to provide an elongated base 1, ends of which base have integrally formed supports 2 and $2^a$ which elevate the base 1 above some supporting object upon which said supports may rest, and to this end, the material in the forming of said supports is bent downwardly at an angle to base 1, then bent vertically to provide substantially parallel transverse end walls 3 and 4, then bent adjacent the end wall 3 to provide a transverse portion 5 substantially in right angular relationship to the end wall 3. The scale has an elongated platform or weighing arm member 6 which is bent at an angle to the end wall 4 and is capable of movement relative to the portion 5. The portion 5 is termed an aligning or indexing tab. The platform 6 is provided with graduations 7 for indicating the weight or stylus pressure when the free end 8 of the platform 6 is in alignment with the tab 5. As previously pointed out, I provide an exponential scale for the platform 6.

In order to provide a weighing scale of practical size, such as to be positioned upon a phonograph turntable surface in a usable manner, it becomes necessary to limit the length of the weighing scale. In limiting the length of the weighing scale and also providing adequate width of the weighing scale platform to rest the stylus upon and simultaneously provide visible graduations, these factors of length and width in turn limit the thickness of the weighing scale material if visible deflections of about $3/16''$ are to be achieved. It would be desirable to incorporate as large a deflection as possible to more easily observe the alignment of the beam end with the fixed tab. Increased deflection can be achieved by any one or all of four means, namely: lengthening the weighing scale; narrowing the weighing scale width; decreasing the thickness of the weighing scale material; using a more resilient material, i. e., a lower value of Young's modulus of elasticity.

To give a concrete example of the design of the weighing scale for use in measuring stylus weights or pressures, and by way of explanation rather than limitation, I may assume a weighing scale having a length of four inches (4''), as this length is suitable for positioning the weighing scale upon the average phonograph turntable. Also, I assume that the width of the weighing scale is one inch (1'').

Appreciably decreasing the weighing scale thickness of seven thousandths (.007) steel strip material is possible but not necessarily desirable, in that the weighing scale would become vulnerable to damage in handling.

Use of a more resilient material is feasible and is predicated upon fabrication art. It is believed this weighing scale can be successfully designed using not only steel but other resilient metals and synthetic or so-called plastic materials.

The design herein described applies to a weighing scale which will permit weighing as little as two (2) grams. By shortening this basic weighing scale design, it will properly function but for higher minimum values.

The operation, uses and advantages of the invention just desecribed are as follows:

A weighing scale constructed in accordance with this invention, and following the principles which I have enumerated, may be easily calibrated through the simple expedient of placing a one cent (1¢) coin at the 3 gram mark which, if the scale is operating properly, will align the end of the weighing platform with the end of the tab. If the end of the weighing platform is not so aligned, then it may be bent upwardly or downwardly at the bight portion between the end wall 4 and said platform. Assuming that stylus pressure is to be determined in accordance with stylus manufacturer's recommended weight, the stylus, together with the tone arm, may rest upon the platform scale adjacent the graduations, and the stylus moved thereover until the platform end aligns with the tab end, whereupon the scale is read to determine the grams of weight of the stylus. Manufacturers usually provide instructions as to how to adjust the tone arm and regulate for proper pressure of the stylus upon a record groove, and it is assumed that the operator will adjust such mechanism for said recommended pressure or weight while using the present invention. The weight or pressure is, of course, determined by reading the graduation value nearest the position of the stylus.

I claim:

In a weighing scale for measuring phonograph pick-up stylus pressure, a one-piece element incorporating a flexible cantilever beam, a flexible integral base, an indexing tab and feet for raising the flexible base above a supporting object to permit the said base to deflect and thereby increase the deflection of the free end of the cantilever; said one-piece element of wide and relatively thin elastic material, the width of said one-piece element adequate to serve as a platform for the phonograph arm and simultaneously visible space containing scale graduations, said flexible cantilever beam free end being above said indexing tab when unloaded, said scale graduations providing fractional unit weight readings so that weight equal to the graduated reading applied at the point of the reading will deflect the end of the cantilever so that it is level with index tab.

References Cited in the file of this patent

UNITED STATES PATENTS

| | | |
|---|---|---|
| 186,267 | Nott | Jan. 16, 1877 |
| 371,920 | Both | Oct. 25, 1887 |
| 2,381,086 | Steele | Aug. 7, 1945 |
| 2,382,289 | Burt | Aug. 14, 1945 |
| 2,476,941 | Woodward | July 19, 1949 |
| 2,576,221 | Segerstad | Nov. 27, 1951 |

FOREIGN PATENTS

| | | |
|---|---|---|
| 237,508 | Germany | Aug. 19, 1911 |

OTHER REFERENCES

Page E-22 of Radio Master, a catalogue published by United Catalogue Publishers, 106 Lafayette St., New York 13, N. Y.

Pages 170-171 "Elements of Strength of Materials," by Timoshenko and MacCullough, published by Van Nostrand Co., May 1940.